US010093277B2

(12) United States Patent
Shin et al.

(10) Patent No.: US 10,093,277 B2
(45) Date of Patent: Oct. 9, 2018

(54) METHOD OF CONTROLLING OPERATION STANDBY TIME OF DRIVER CONVENIENCE SYSTEM

(71) Applicant: Hyundai Motor Company, Seoul (KR)

(72) Inventors: Won Ho Shin, Seoul (KR); Si Jun Kim, Seoul (KR); Dong Youl Lee, Seoul (KR); Hai Jin Seo, Gyeonggi-do (KR); Jong Il Yu, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/370,613

(22) Filed: Dec. 6, 2016

(65) Prior Publication Data

US 2018/0056938 A1 Mar. 1, 2018

(30) Foreign Application Priority Data

Aug. 31, 2016 (KR) .................. 10-2016-0111306

(51) Int. Cl.
*B60R 25/00* (2013.01)
*B60R 25/24* (2013.01)
(Continued)

(52) U.S. Cl.
CPC ............ *B60R 25/2081* (2013.01); *B60Q 1/04* (2013.01); *B60R 1/006* (2013.01); *B60R 25/24* (2013.01);
(Continued)

(58) Field of Classification Search
CPC ..... B60R 25/00; B60R 25/2081; B60R 25/24; B60R 1/00; B60R 1/006; E05F 15/00;
(Continued)

(56) References Cited

U.S. PATENT DOCUMENTS 4,208,615 A * 6/1980 Jones ................. B60Q 1/143
315/82
9,214,083 B2 12/2015 Lim et al.
(Continued)

FOREIGN PATENT DOCUMENTS

KR 10-2000-0055779 A 9/2000
KR 10-0878908 B1 1/2009
(Continued)

*Primary Examiner* — Yonel Beaulieu
(74) *Attorney, Agent, or Firm* — Mintz Levin Cohn Ferris Glovsky and Popeo, P.C.; Peter F. Corless (57) ABSTRACT

A method of controlling an operation standby time of a driver convenience system installed in a vehicle using a control unit including a memory and a processor includes: setting a plurality of learning positions; generating a plurality of test cases based on a day of a week and a time associated with each of the plurality of set learning positions; receiving a plurality of sensor signals and a plurality of switch signals associated with the driver convenience system; generating a learned neural network algorithm by using a neural network algorithm to learn an operation standby time of each of the plurality of generated test cases based on the plurality of sensor signals and the plurality of switch signals associated with the driver convenience system; and determining an operation standby time of the driver convenience system at a current learning position using the learned neural network algorithm.

18 Claims, 5 Drawing Sheets

(51) Int. Cl.
  *E05F 15/00* (2015.01)
  *B60Q 1/00* (2006.01)
  *B60Q 1/04* (2006.01)
  *B60R 25/20* (2013.01)
  *E05F 15/76* (2015.01)
  *E05F 15/79* (2015.01)
  *B60R 1/00* (2006.01)
  *E05B 81/54* (2014.01)
  *E05F 15/70* (2015.01)

(52) U.S. Cl.
  CPC .............. *E05B 81/54* (2013.01); *E05F 15/70* (2015.01); *E05F 15/76* (2015.01); *E05F 15/79* (2015.01); *E05Y 2900/50* (2013.01); *E05Y 2900/546* (2013.01); *E05Y 2900/548* (2013.01)

(58) Field of Classification Search
  CPC . E05F 15/76; E05F 15/79; B60Q 1/00; B60Q 1/006; E05B 81/54
  See application file for complete search history.

(56) References Cited

U.S. PATENT DOCUMENTS

| | | | |
|---|---|---|---|
| 9,862,311 B2* | 1/2018 | Kiriyama | B60Q 1/346 |
| 2003/0066297 A1* | 4/2003 | Ichishi | B60H 1/00735 |
| | | | 62/161 |
| 2004/0129007 A1* | 7/2004 | Tomita | B60H 1/00064 |
| | | | 62/157 |
| 2007/0132552 A1* | 6/2007 | Kurpinski | B60R 25/2036 |
| | | | 340/5.72 |
| 2007/0216517 A1* | 9/2007 | Kurpinski | B60R 25/2036 |
| | | | 340/5.72 |
| 2008/0243312 A1* | 10/2008 | Nakamura | G01C 21/26 |
| | | | 701/1 |
| 2009/0085720 A1* | 4/2009 | Kurpinski | B60R 25/246 |
| | | | 340/5.64 |
| 2009/0192670 A1* | 7/2009 | Hara | B60R 16/037 |
| | | | 701/36 |
| 2014/0169139 A1* | 6/2014 | Lee | G08C 17/00 |
| | | | 367/197 |
| 2014/0176304 A1* | 6/2014 | Park | G07C 9/00309 |
| | | | 340/5.61 |
| 2014/0292483 A1* | 10/2014 | Kim | B60R 25/24 |
| | | | 340/5.63 |
| 2016/0026967 A1* | 1/2016 | Shah | G06Q 10/083 |
| | | | 701/28 |
| 2017/0244472 A1* | 8/2017 | Saito | H04B 7/15507 |

FOREIGN PATENT DOCUMENTS

| | | |
|---|---|---|
| KR | 2012-0062115 A | 6/2012 |
| KR | 2014-0076835 A | 6/2014 |
| KR | 2014-0083278 A | 7/2014 |
| KR | 10-2015-0070453 A | 6/2015 |
| KR | 10-2015-0145294 A | 12/2015 |
| KR | 10-1588753 B1 | 1/2016 |

* cited by examiner

METHOD OF CONTROLLING OPERATION STANDBY TIME OF DRIVER CONVENIENCE SYSTEM

CROSS-REFERENCE TO RELATED APPLICATION

This application claims the benefit of and priority to Korean Patent Application No. 10-2016-0111306, filed on Aug. 31, 2016 in the Korean Intellectual Property Office, the disclosure of which is incorporated herein in its entirety by reference as if fully set forth herein.

TECHNICAL FIELD

The present disclosure generally relates to a method of controlling an operation standby time for a driver convenience system, and more particularly, to a technique that changes a fixed operation standby time for a driver convenience system based on a usage pattern of a driver.

BACKGROUND

In general, driver convenience systems installed in a vehicle for the purpose of enhancing driver convenience include features such as a smart key system, a power trunk module (PTM) for opening a trunk, a body control module (BCM) for sensing a smart key, etc. When a condition for a specific operation is met, the driver convenience system performs the specific operation after a preset standby time is elapsed. For example, the PTM typically has a standby time of about 3 seconds from a time when a smart key is sensed in a trunk region to a time when the trunk is opened. The BCM typically has a standby time of about 15 seconds from a time when the smart key is sensed in a welcome mode to a time when a side mirror is folded again. In addition, the BCM typically has a standby time of about 15 seconds from a time when a driver exits the vehicle in an escort mode to a time when a headlamp is turned off.

Since conventional driver convenience systems are operated based on a fixed standby time, it is difficult to provide a customized operation standby time to a driver. For example, in a case where a driver immediately loads a trunk with luggage waiting only one second after the trunk has opened when a smart key of the driver is sensed (e.g., in an underground parking lot of a department store where the moving distance is very short), since the PTM does not open the trunk until 3 seconds have elapsed, the PTM keeps the driver waiting while the driver must continue to hold the luggage.

SUMMARY

The present disclosure has been made to solve the above-mentioned problems occurring in the related art while advantages achieved by the related art are maintained intact.

An aspect of the present disclosure provides a method of controlling an operation standby time for a driver convenience system, which can learn a driver's usage pattern of the driver convenience system based on a neural network algorithm such that the operation standby time of the driver convenience system is controlled using the driver's usage pattern to provide user-customized service.

The technical problems to be solved by the present inventive concept are not limited to the aforementioned problems, and any other technical problems not mentioned herein will be clearly understood from the following description by those skilled in the art to which the present disclosure pertains. In addition, the objects and advantages of the present disclosure may be realized by means of instrumentalities and combinations particularly pointed out in the appended claims.

According to embodiments of the present disclosure, a method of controlling an operation standby time of a driver convenience system installed in a vehicle using a control unit including a memory and a processor includes: setting a plurality of learning positions; generating a plurality of test cases based on a day of a week and a time associated with each of the plurality of set learning positions; receiving a plurality of sensor signals and a plurality of switch signals associated with the driver convenience system; generating a learned neural network algorithm by using a neural network algorithm to learn an operation standby time of each of the plurality of generated test cases based on the plurality of sensor signals and the plurality of switch signals associated with the driver convenience system; and determining an operation standby time of the driver convenience system at a current learning position using the learned neural network algorithm.

Furthermore, in accordance with embodiments of the present disclosure, a system includes: a driver convenience system installed in a vehicle; and a control unit including a memory storing program instructions and a processor executing the stored program instructions, the program instructions when executed by the processor causing the processor to: set a plurality of learning positions; generate a plurality of test cases based on a day of a week and a time associated with each of the plurality of set learning positions; receive a plurality of sensor signals and a plurality of switch signals associated with the driver convenience system; generate a learned neural network algorithm by using a neural network algorithm to learn an operation standby time of each of the plurality of generated test cases based on the plurality of sensor signals and the plurality of switch signals associated with the driver convenience system; and determine an operation standby time of the driver convenience system at a current learning position using the learned neural network algorithm.

Furthermore, in accordance with embodiments of the present disclosure, a non-transitory computer readable medium contains program instructions for controlling an operation standby time of a driver convenience system installed in a vehicle, the program instructions when executed a processor causing the processor to: set a plurality of learning positions; generate a plurality of test cases based on a day of a week and a time associated with each of the plurality of set learning positions; receive a plurality of sensor signals and a plurality of switch signals associated with the driver convenience system; generate a learned neural network algorithm by using a neural network algorithm to learn an operation standby time of each of the plurality of generated test cases based on the plurality of sensor signals and the plurality of switch signals associated with the driver convenience system; and determine an operation standby time of the driver convenience system at a current learning position using the learned neural network algorithm.

According to the embodiments described herein of controlling an operation standby time for a driver convenience system, a driver's usage pattern of the driver convenience system may be learned based on a neural network algorithm such that the operation standby time of the driver convenience system is controlled by using the driver's usage pattern, thereby providing user-customized service.

BRIEF DESCRIPTION OF THE DRAWINGS

The above and other objects, features and advantages of the present disclosure will be more apparent from the following detailed description taken in conjunction with the accompanying drawings.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF EMBODIMENTS

The above and other objects, features and advantages of the present disclosure will be more clearly understood from the following detailed description taken in conjunction with the accompanying drawings, and thus the technical idea of the present disclosure will be easily embodied by those skilled in the art. In addition, a detailed description of well-known features or functions will be ruled out in order not to unnecessarily obscure the gist of the present disclosure. Hereinafter, exemplary embodiments of the present disclosure will be described in detail with reference to the accompanying drawings.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control unit in conjunction with one or more other components, as would be appreciated by a person of ordinary skill in the art.

Furthermore, the control unit of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Furthermore, in the present disclosure, an operation standby time refers to a time period from a time when a condition is met to a time when an actual operation is completed. For example, the operation standby time includes a time period from a time when a smart key is sensed in a trunk region to a time (opening start time) when a power trunk module (PTM) opens a trunk, a time period (for example, 15 seconds) from a time when a body control module (BCM) senses a smart key in a welcome mode (at this time, a folded side mirror is immediately unfolded) to a time (a side mirror folding time) when the side mirror is folded again, a time period (for example, 15 seconds) from a time when a driver exits the vehicle in an escort mode (at this time, a headlamp is immediately turned on) to a time when the headlamp is turned off, etc.

In addition, in the present disclosure, a driver represents a user possessing a smart key of a corresponding vehicle.

Figure 1:
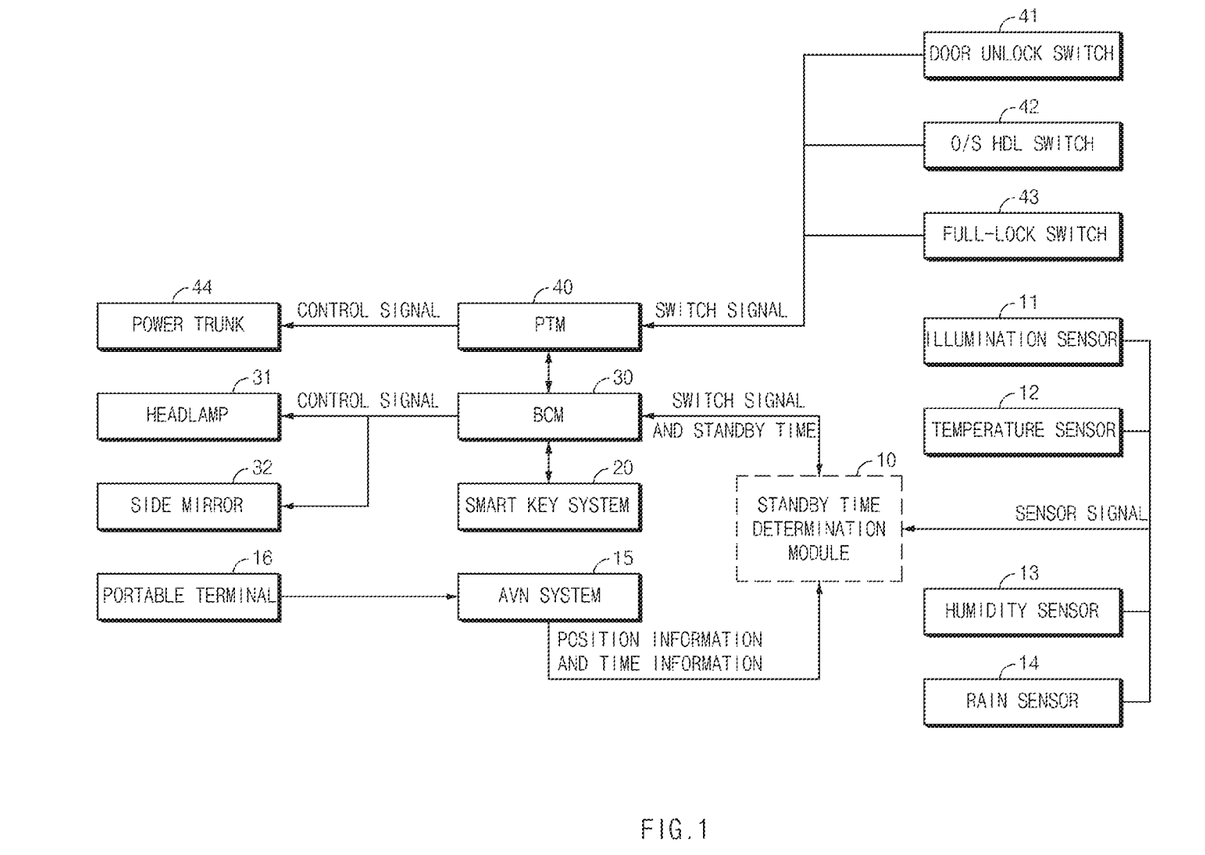
FIG. 1 is a block diagram illustrating a driver convenience system applied to embodiments of the present disclosure.

Referring now to the presently disclosed embodiments, FIG. 1 is a block diagram illustrating a driver convenience system applied to embodiments of the present disclosure.

As shown in FIG. 1, a driver convenience system according to embodiments of the present disclosure includes a standby time determination module 10, an illumination sensor 11, a temperature sensor 12, a humidity sensor 13, a rain sensor 14, an audio-video-navigation (AVN) system 15, a portable terminal 16, a smart key system 20, a body control module (BCM) 30, a headlamp 31, a side mirror 32, a power trunk module (PTM) 40, a door unlock switch 41, an outside handle (O/S HDL) switch 42, a full-lock switch 43, and a power trunk 44.

Describing the elements mentioned above, the standby time determination module 10, which is a kind of controller, learns a driver's usage pattern of the driver convenience system based on a neural network algorithm and determines an operation standby time of the driver convenience system by using the driver's usage pattern. That is, the standby time determination module 10 receives various kinds of information (such as position (e.g., location) information, time information, route information, etc.) from the AVN system 15.

In addition, the standby time determination module 10 receives various kinds of sensor signals corresponding to outdoor illumination of a vehicle sensed by the illumination sensor 11, an outdoor temperature of the vehicle sensed by the temperature sensor 12, outdoor humidity of the vehicle sensed by the humidity sensor 13, and a quantity of rainwater sensed by the rain sensor 14. The standby time determination module 10 may directly receive the plurality of sensor signals from the corresponding sensors or may collect the various kinds of sensor signals through a vehicle network. The vehicle network includes a controller area network (CAN), a local interconnect network (LIN), FlexRay, and media oriented system transport (MOST).

In addition, the standby time determination module 10 receives various kinds of switch signals corresponding to an operation signal (a door lock signal or door unlock signal) of the door unlock switch 41, an operation signal (trunk opening signal) of the outside handle switch 42, and an operation signal (trunk opening signal or trunk closing signal) of the full-lock switch 43. The plurality of switch signals are transmitted through the BCM 30.

In addition, the standby time determination module 10 receives a headlamp-on signal or a headlamp-off signal from the smart key system 20 installed to the vehicle as the switch signal. That is, a smart key transmits the headlamp-on signal or headlamp-off signal to the smart key system 20 in response to a switch operation of a driver, and the smart key system 20 transfers the headlamp-on signal or headlamp-off signal to the BCM 30. Then, the BCM 30 transfers the headlamp-on signal or headlamp-off signal to the standby time determination module 10.

Ultimately, the standby time determination module 10 learns the driver's usage pattern of the driver convenience system by using the various kinds of information, various kinds of sensor and switch signals based on the neural network algorithm. That is, the standby time determination module 10 allows a neural network to learn in a supervised learning scheme, in which various sensor and switch signals corresponding to various information (e.g., information about a position, a day of the week, time, and the like) serve as inputs of an input layer and a standby time serves as an output of an output layer.

Then, the standby time determination module 10 determines an optimal standby time at a current position by using the learned neural network. That is, the standby time determination module 10 first determines which of the test cases classified according to a day of the week and a time by position the current environment (i.e., condition) belongs to. If the test case is determined, the standby time determination module 10 determines a standby time suitable to the current environment (e.g., illumination, temperature, humidity or the quantity of rainwater) by using a list (on which standby times corresponding to sensor signals are written) of data learned in the corresponding test case. In this case, the standby time corresponding to a test case most similar to the current environment may be selected from the data list. Alternatively, a final standby time may be obtained by calculating a varying value of the standby time with a difference between sensor values. In addition, after the varying value of the standby time with the difference between sensor values is calculated, the final standby time may be calculated by applying weights preset to the sensors, respectively. In this case, a technique of searching for output values most similar to the current sensor values from the data list on which a plurality of items and output values corresponding to the items are written and a technique of calculating a variation of an output value based on a difference in each item are well known in the art.

Meanwhile, the standby time determination module 10 may utilize a clustering scheme to generate a test case based on a day of the week and time at each position. The clustering scheme that is a grouping technique for limiting the huge number of test cases is generally known in the art.

Next, the illumination sensor 11 is installed to an outside of the vehicle to sense illumination.

Next, the temperature sensor 12 senses an outdoor temperature of the vehicle.

Next, the humidity sensor 13 senses outdoor humidity of the vehicle.

Next, the rain sensor 14 is mounted on a low end of a windshield glass of the vehicle to sense a quantity of rainwater.

Next, the AVN system 15, which controls the audio, video and navigation of the vehicle, provides current location information matched with map information, route information, weather information, traffic information, time information, etc., to the standby time determination module 10.

In addition, the AVN system 15 transfers goods purchase information (e.g., information about purchase items, the number, weight and volume of each purchase item, etc.) received from the portable terminal to the standby time determination module 10. In this case, the portable terminal 16 may include a smartphone and may receive the purchase information of the driver from an external server.

Next, the smart key system 20 transfers the headlamp-on signal and the headlamp-off signal, which are from the smart key, to the BCM 30.

Next, the BCM 30 controls such that the headlamp 31 is turned on/off and transfers various kinds of switch signals, which are transferred from the PTM 40 and the smart key system 20, to the standby time determination module 10.

In addition, the BCM 30 controls an operation standby time of the headlamp 31 by using a first standby time determined by the standby time determination module 10. Preferably, this is applied in case that the headlamp 31 is used for the escort function of a vehicle.

In addition, the BCM 30 controls an operation standby time of the side mirror 32 by using a second standby time determined by the standby time determination module 10. Preferably, this is applied in case that the side mirror 32 is used for the welcome function of a vehicle.

In addition, the BCM 30 transfers a third standby time determined by the standby time determination module 10 to the PTM 40. Thus, the PTM 40 controls an operation standby time of the power trunk 41 by using the third standby time transferred from the BCM 30.

Next, the door unlock switch 41 is a switch for unlocking a door and an operation signal of the door unlock switch 41 is used on condition that the side mirror 32 is unfolded in a welcome mode. That is, when a driver operates the door unlock switch 41, the side mirror 32 is automatically unfolded.

Next, the outside handle switch 42 is a switch for opening the trunk and an operation signal of the outside handle switch 42 is used on condition that the power trunk 44 is opened. That is, when a driver operates the outside handle switch 42, the power trunk 44 is automatically opened.

Next, the full-lock switch 43 is a switch for sensing a closed state of the power trunk 44. It may be known whether the trunk is opened or closed based on an operation signal of the full-lock switch 43.

In the embodiment of the present disclosure, although the example of implementing the standby time determination module 10 as a separated module is described, the function of the standby time determination module 10 may be implemented in an algorithm type such that the function is performed by a controller (not shown) in the BCM 30 or the PTM 40.

For example, when the function (i.e., the standby time determination algorithm) is implemented such that the controller in the BCM 30 performs the function, the BCM 30 may directly receive various kinds of information from the AVN system 15, the illumination sensor 11, the temperature sensor 12, the humidity sensor 13 and the rain sensor 14 or may collect the various kinds of information through the vehicle network.

Figure 2:
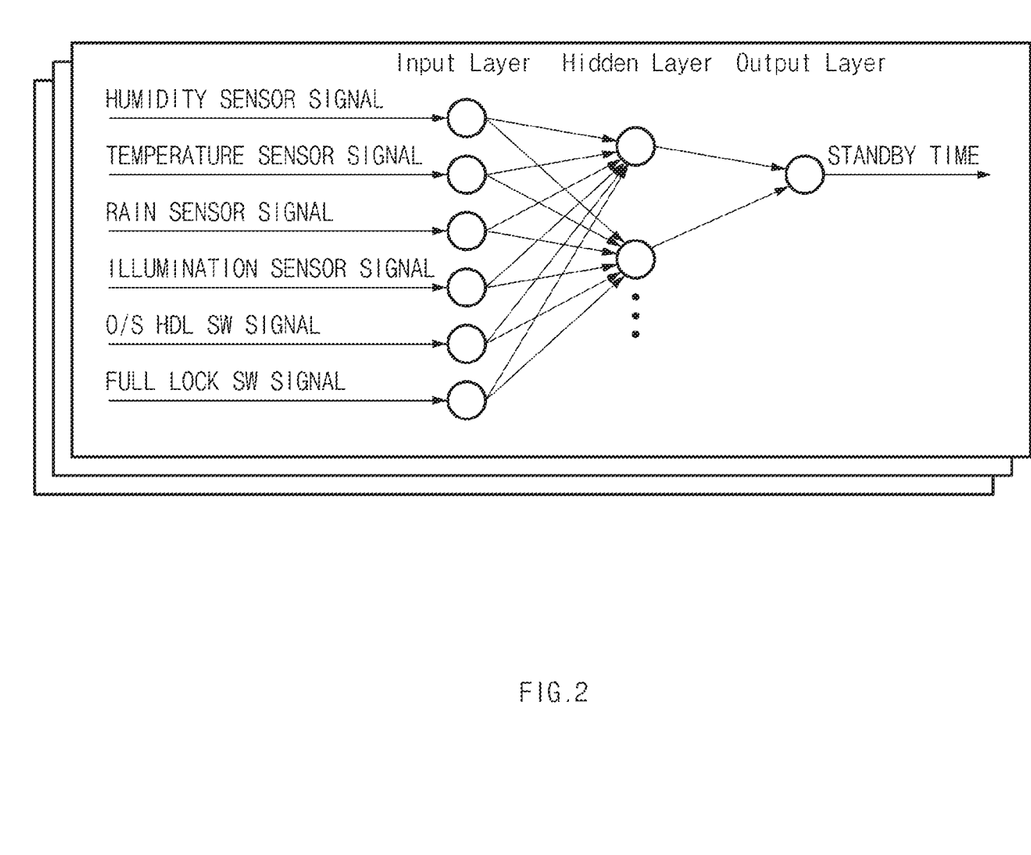
FIG. 2 is a view illustrating a scheme of determining an operation standby time of a power trunk according to embodiments of the present disclosure.

A process of determining the operation standby time of the power trunk by the controller according to embodiments of the present disclosure will be described with reference to FIG. 2.

First, a learning position is set by interworking with the AVN system 15. That is, a driver himself may set the learning point on a map. The learning position may be automatically generated based on the frequency of using the trunk.

In this case, the map-based scheme, which is a scheme of using information obtained through the AVN system 15, sets a position (for example, a supermarket, a department store, etc.) at which the driver can purchase goods in large quantities, as the learning position. In addition, the trunk using frequency based scheme is a scheme that sets a position at which the operating frequency of the trunk exceeds a reference value, as the learning position. The number f of the generated learning positions varies with a driver taste.

Thereafter, test cases are generated based on a day of the week, a current time and a return time (which is a time taken to sense a driver in a trunk region after a door is locked) at each learning position. In this case, to limit the number of test cases, the test cases are grouped into the predetermined number m of clusters by using a scheme of "fuzzy k-means clustering". Thus, the total number of test cases is 'f×m'.

Then, the standby times are learned based on the various kinds of sensor signals and the various kinds of switch signals in each test case. That is, as shown in FIG. 2, the learning is performed on a case-by-case basis using the neural network algorithm of a supervised learning scheme in which the various kinds of sensor signal and the various kinds of switch signals are input to output an optimal standby time.

In this case, when the trunk opening signal is input from the outside handle switch 42 before a standard standby time (for example, three seconds) is elapsed, the learning is performed to reduce the standby time. When the trunk closing signal is input from the full-lock switch 43 before a threshold time is elapsed after the standard standby time is elapsed and the trunk is opened, the learning is performed to extend the standby time. Since the fact that the trunk closing signal is input from the full-lock switch 43 before the threshold time is elapsed implies that the driver has no intention to use the trunk, the trunk is unnecessarily opened. Thus, the trunk operation standby time extends.

The various kinds of sensor signals include a sensor signal (hereinafter, referred to as an "illumination sensor signal") output from the illumination sensor 11, a sensor signal (hereinafter, referred to as a "temperature sensor signal") output from the temperature sensor 12, a sensor signal (hereinafter, referred to as a "humidity sensor signal") output from the humidity sensor 13, and a sensor signal (hereinafter, referred to as a "rain sensor signal") output from the rain sensor 14.

In addition, the various kinds of switch signals include an operation signal (e.g., trunk opening signal) of the outside handle switch 42 and an operation signal (e.g., trunk opening or closing signal) of the full-lock switch 43.

Then, when the smart key of the driver is sensed in the trunk region after the driver arrives at the preset learning position, that is, the driver enters the trunk region to load the vehicle after purchasing goods at a store (e.g., learning position). That is, the trunk opening condition is met at the learning position, the operation standby time of the power trunk is determined at the current position by using the learned neural network algorithm. Then, the PTM 40 opens the power trunk after the determined operation standby time or the power trunk is elapsed.

Meanwhile, the goods purchase information (e.g., information about purchase items, the number, weight and volume for each purchase item, etc.) may be received from the portable terminal 16 through the AVN system 15.

In this case, after the weight is calculated based on the received goods purchase information, if the weight exceeds the threshold value, it is determined that the operation standby time of the trunk is 0 (zero) second, as a one-time operation standby time. That is, when the smart key of the driver is sensed in the trunk region, the trunk is immediately opened.

Figure 3:
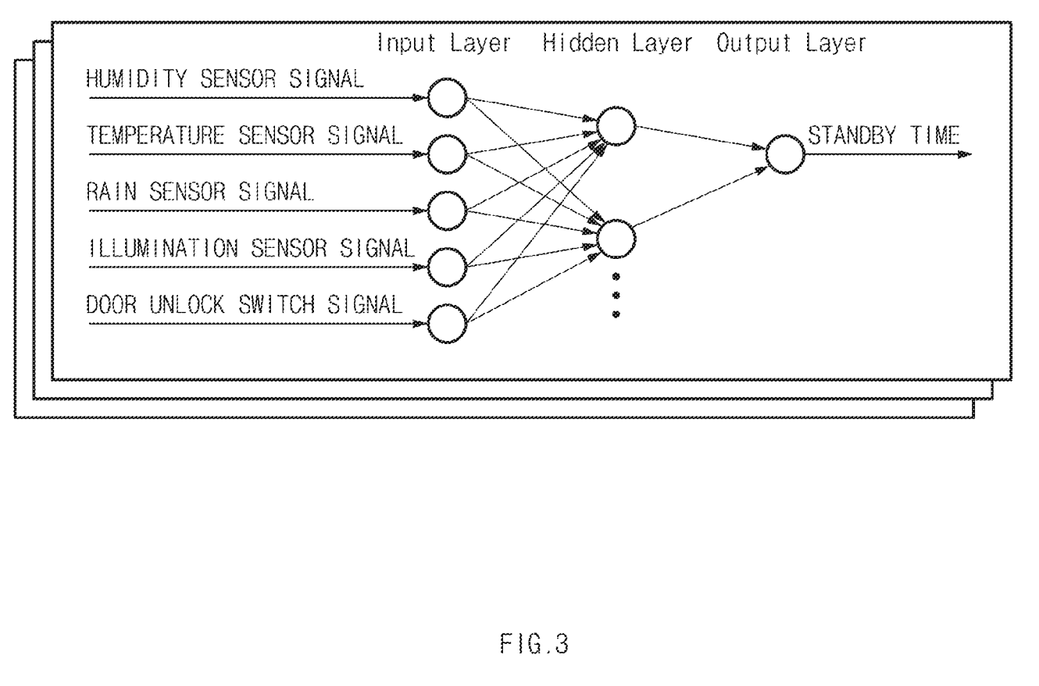
FIG. 3 is a view illustrating a scheme of determining an operation standby time of a side mirror in a welcome mode according to embodiments of the present disclosure.

A process of determining the operation standby time of the side mirror in the welcome mode by the controller according to embodiments of the present disclosure will be described with reference to FIG. 3.

First, the learning position is set by interworking with the AVN system 15. That is, the driver himself may set the learning position on a map. The position of which the visit count exceeds a reference number may be automatically set as the learning position. The number f of the generated learning positions varies with a driver taste.

Thereafter, test cases are generated based on a day of the week and a current time at each learning position. In this case, to limit the number of test cases, the test cases are grouped into the predetermined number m of clusters by using a scheme of "fuzzy k-means clustering". Thus, the total number of the test cases is 'f×m'.

Then, the standby times are learned based on the various kinds of sensor signals and the various kinds of switch signals in each test case. That is, as shown in FIG. 3, the learning is performed on a case-by-case basis using the neural network algorithm of a supervised learning scheme in which the various kinds of sensor signal and the various kinds of switch signals are input to output an optimal standby time.

The various kinds of sensor signals include a sensor signal (hereinafter, referred to as an "illumination sensor signal") output from the illumination sensor 11, a sensor signal (hereinafter, referred to as a "temperature sensor signal") output from the temperature sensor 12, a sensor signal (hereinafter, referred to as a "humidity sensor signal") output from the humidity sensor 13, and a sensor signal (hereinafter, referred to as a "rain sensor signal") output from the rain sensor 14.

In addition, the various kinds of switch signals include an operation signal (e.g., door lock or unlock signal) of the door unlock switch 41.

Then, when the smart key of the driver is sensed at the preset learning position, the operation standby time of the side mirror is determined at the current position by using the learned neural network algorithm.

Then, the BCM 30 folds the side mirror after the determined operation standby time of the side mirror is elapsed.

Figure 4:
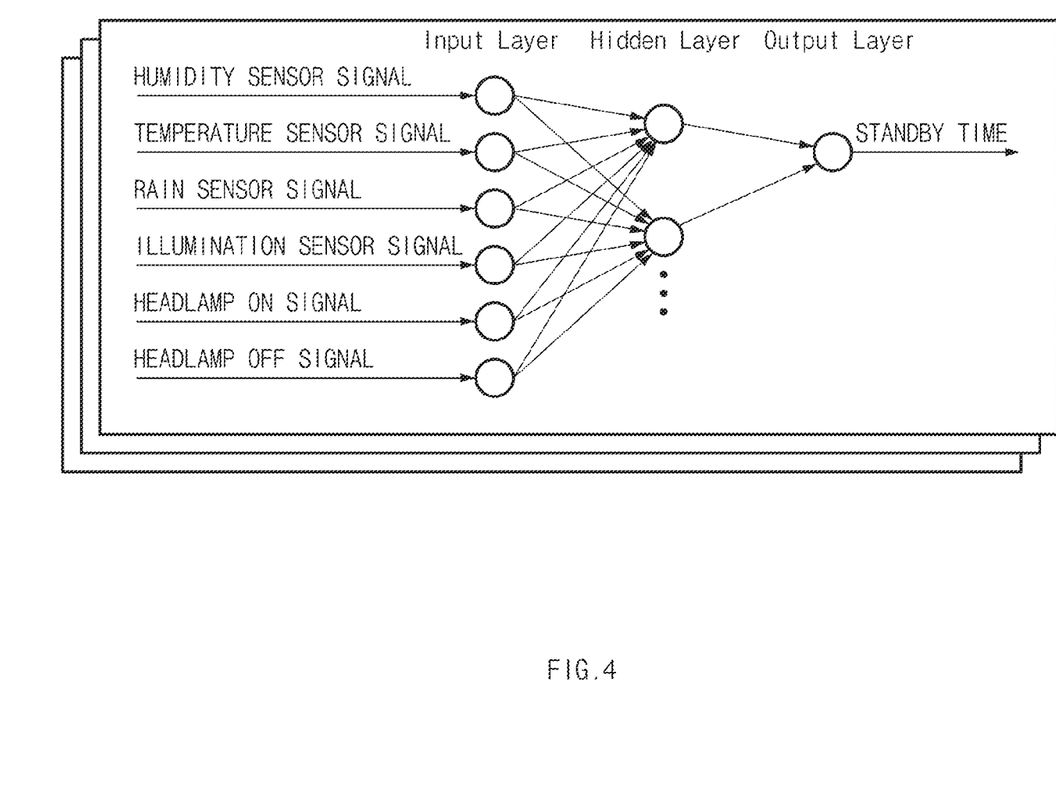
FIG. 4 is a view illustrating a scheme of determining an operation standby time of a headlamp in an escort mode according to embodiments of the present disclosure.

A process of determining the operation standby time of the side mirror in the escort mode by the controller according to embodiments of the present disclosure will be described with reference to FIG. 4.

First, the learning position is set by interworking with the AVN system 15. That is, the driver himself may set the learning position on a map. The position of which the visit count exceeds a reference number may be automatically set as the learning position. The number f of the generated learning positions varies with a driver taste.

Thereafter, test cases are generated based on a day of the week and a current time at each learning position. In this case, to limit the number of generated test cases, the test cases are grouped into the predetermined number m of clusters by using a scheme of "fuzzy k-means clustering". Thus, the total number of the test cases is 'f×m'.

Then, the standby times are learned based on the various kinds of sensor signals and the various kinds of switch signals in each test case. That is, as shown in FIG. 4, the learning is performed case-by-case using the neural network algorithm of a supervised learning scheme in which the various kinds of sensor signals and the various kinds of switch signals are input to output an optimal standby time. This process generates a learned neural network algorithm which can be applied later to determine a operation standby time at a current time.

The various kinds of sensor signals include a sensor signal (hereinafter, referred to as an "illumination sensor signal") output from the illumination sensor 11, a sensor signal (hereinafter, referred to as a "temperature sensor signal") output from the temperature sensor 12, a sensor signal (hereinafter, referred to as a "humidity sensor signal") output from the humidity sensor 13, and a sensor signal (hereinafter, referred to as a "rain sensor signal") output from the rain sensor 14.

In addition, the various kinds of switch signals include headlamp-on or headlamp-off signals transmitted from the smart key.

Then, when the smart key of the driver is sensed at the preset learning position, the operation standby time of the headlamp at the current position is determined by using the learned neural network algorithm.

Then, the BCM 30 turns off the headlamp after the determined operation standby time of the headlamp is elapsed.

Figure 5:
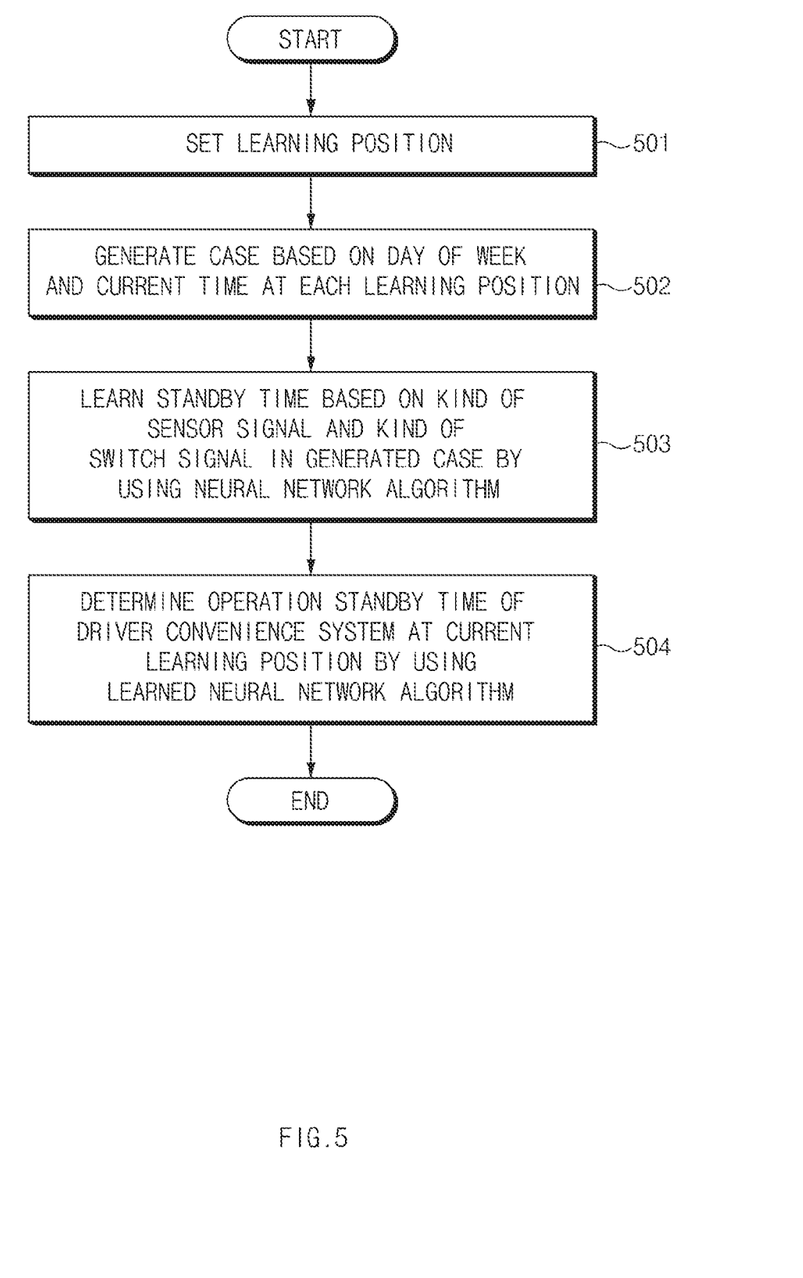
FIG. 5 is a flowchart illustrating a method of controlling an operation standby time for a driver convenience system according to embodiments of the present disclosure.

FIG. 5 is a flowchart illustrating a method of controlling an operation standby time for a driver convenience system according to embodiments of the present disclosure.

First, the learning position is set (501).

Thereafter, test cases are generated based on a day of the week and a current time at each learning position (502). In this case, to limit the number of test cases, the test cases are grouped into the predetermined number m of clusters by using a scheme of "fuzzy k-means clustering".

Then, using the neural network algorithm, the standby times are learned based on the various kinds of sensor signals and the various kinds of switch signals in each test case (503), thereby producing a learned neural network algorithm.

In this case, the various kinds of sensor signals include a sensor signal (hereinafter, referred to as an "illumination sensor signal") output from the illumination sensor 11, a sensor signal (hereinafter, referred to as a "temperature sensor signal") output from the temperature sensor 12, a sensor signal (hereinafter, referred to as a "humidity sensor signal") output from the humidity sensor 13, and a sensor signal (hereinafter, referred to as a "rain sensor signal") output from the rain sensor 14. In case of determining the operation standby time of the power trunk, the various kinds of switch signals include an operation signal (e.g., trunk opening signal) of the outside handle switch 42 and an operation signal (e.g., trunk opening or closing signal) of the full-lock switch 43.

Then, the operation standby time of the driver convenience system at the current position is determined by using the learned neural network algorithm (504).

In this case, the driver convenience system includes the PTM 40, and the BCM 30. The PTM 40 determines the standby time for which the trunk is automatically opened after the smart key of the driver is sensed in the trunk region. The BCM determines the standby time for which the side mirror is folded after the smart key is sensed in the welcome mode and the standby time for which the headlamp is turned off after the driver exits the vehicle in an escort mode, respectively.

Hereinabove, although the present disclosure has been described with reference to embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method of controlling an operation standby time of a driver convenience system installed in a vehicle using a control unit including a memory and a processor, the method comprising:
   setting a plurality of learning positions;
   generating a plurality of test cases based on a day of a week and a time associated with each of the plurality of set learning positions;
   receiving a plurality of sensor signals and a plurality of switch signals associated with the driver convenience system;
   generating a learned neural network algorithm by using a neural network algorithm to learn an operation standby time of each of the plurality of generated test cases based on the plurality of sensor signals and the plurality of switch signals associated with the driver convenience system; and
   determining an operation standby time of the driver convenience system at a current learning position using the learned neural network algorithm,
   wherein, when a condition for a specific operation is met at the current learning position, the driver convenience system performs the specific operation after the determined operation standby time has elapsed.

2. The method of claim 1, wherein the plurality of sensor signals include at least one of an illumination sensor signal, a temperature sensor signal, a humidity sensor signal, and a rain sensor signal.

3. The method of claim 1, wherein the test cases are grouped through a clustering scheme.

4. The method of claim 1, wherein the driver convenience system includes a power trunk module (PTM).

5. The method of claim 4, wherein the operation standby time includes a standby time from a time when a smart key is sensed in a trunk region to a time when a trunk of the vehicle is opened.

6. The method of claim 4, wherein the plurality of switch signals includes at least one of a trunk opening signal of an outside handle switch and a trunk closing signal of a full-lock switch.

7. The method of claim 4, wherein the time associated with a given set learning position for the generating of a given test case includes a time taken to sense a driver in a trunk region after a door of the vehicle is locked.

8. The method of claim 1, further comprising:
calculating a weight of a purchased article based on article purchase information when the article purchase information is received from a portable terminal of a driver at the current learning position; and
determining the operation standby time as zero seconds when the calculated weight exceeds a threshold value.

9. The method of claim 8, wherein the article purchase information includes information about purchase items and a number, a weight, and a volume of each of the purchase items.

10. The method of claim 1, wherein the driver convenience system includes a smart key system.

11. The method of claim 10, wherein the operation standby time includes a standby time from a time when a smart key is sensed to a time when a side mirror is folded.

12. The method of claim 10, wherein the plurality of switch signals includes a door unlock signal of a door unlock switch.

13. The method of claim 1, wherein the operation standby time includes an operation standby time of a headlamp of the vehicle.

14. The method of claim 13, wherein the operation standby time of the headlamp includes a standby time from a time when a driver exits the vehicle to a time when the headlamp is turned off.

15. The method of claim 13, wherein the plurality of switch signals includes at least one of a headlamp-on signal and a headlamp-off signal transmitted from a smart key.

16. A system comprising:
a driver convenience system installed in a vehicle; and
a control unit including a memory storing program instructions and a processor executing the stored program instructions, the program instructions when executed by the processor causing the processor to:
set a plurality of learning positions;
generate a plurality of test cases based on a day of a week and a time associated with each of the plurality of set learning positions;
receive a plurality of sensor signals and a plurality of switch signals associated with the driver convenience system;
generate a learned neural network algorithm by using a neural network algorithm to learn an operation standby time of each of the plurality of generated test cases based on the plurality of sensor signals and the plurality of switch signals associated with the driver convenience system; and
determine an operation standby time of the driver convenience system at a current learning position using the learned neural network algorithm,
wherein, when a condition for a specific operation is met at the current learning position, the driver convenience system performs the specific operation after the determined operation standby time has elapsed.

17. A non-transitory computer readable medium containing program instructions for controlling an operation standby time of a driver convenience system installed in a vehicle, the program instructions when executed a processor causing the processor to:
set a plurality of learning positions;
generate a plurality of test cases based on a day of a week and a time associated with each of the plurality of set learning positions;
receive a plurality of sensor signals and a plurality of switch signals associated with the driver convenience system;
generate a learned neural network algorithm by using a neural network algorithm to learn an operation standby time of each of the plurality of generated test cases based on the plurality of sensor signals and the plurality of switch signals associated with the driver convenience system; and
determine an operation standby time of the driver convenience system at a current learning position using the learned neural network algorithm,
wherein, when a condition for a specific operation is met at the current learning position, the driver convenience system performs the specific operation after the determined operation standby time has elapsed.

18. A method of controlling an operation standby time of a driver convenience system installed in a vehicle using a control unit including a memory and a processor, the method comprising:
setting a plurality of learning positions;
generating a plurality of test cases based on a day of a week and a time associated with each of the plurality of set learning positions;
receiving a plurality of sensor signals and a plurality of switch signals associated with the driver convenience system;
generating a learned neural network algorithm by using a neural network algorithm to learn an operation standby time of each of the plurality of generated test cases based on the plurality of sensor signals and the plurality of switch signals associated with the driver convenience system;
determining an operation standby time of the driver convenience system at a current learning position using the learned neural network algorithm;
calculating a weight of a purchased article based on article purchase information when the article purchase information is received from a portable terminal of a driver at the current learning position; and
determining the operation standby time as zero seconds when the calculated weight exceeds a threshold value.

* * * * *